(12) United States Patent
Kobayashi

(10) Patent No.: US 12,742,113 B2
(45) Date of Patent: Sep. 22, 2026

(54) POLYMERIZABLE COMPOSITION FOR OPTICAL ARTICLE AND OPTICAL ARTICLE

(71) Applicant: HOYA LENS THAILAND LTD., Pathumthani (TH)

(72) Inventor: Kei Kobayashi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 65 days.

(21) Appl. No.: 18/846,162

(22) PCT Filed: Mar. 30, 2023

(86) PCT No.: PCT/JP2023/013259
§ 371 (c)(1),
(2) Date: Sep. 11, 2024

(87) PCT Pub. No.: WO2023/190905
PCT Pub. Date: Oct. 5, 2023

(65) Prior Publication Data

US 2025/0188342 A1 Jun. 12, 2025

(30) Foreign Application Priority Data

Mar. 31, 2022 (JP) ................................ 2022-058879

(51) Int. Cl.
*C09K 9/02* (2006.01)
*C08F 222/10* (2006.01)
(Continued)

(52) U.S. Cl.
CPC .......... *C09K 9/02* (2013.01); *C08F 222/1063* (2020.02); *C09D 4/06* (2013.01);
(Continued)

(58) Field of Classification Search
CPC ....... C09K 9/02; C08F 222/1063; C09D 4/06; C09D 5/29; C09D 135/02; G02C 7/102
See application file for complete search history.

(56) References Cited

U.S. PATENT DOCUMENTS

2004/0220292 A1* 11/2004 Momoda .................. C09D 4/00 522/71
2022/0049037 A1 2/2022 Ohara et al.
2022/0289878 A1* 9/2022 Shimada ................ G02B 1/041
2023/0109024 A1* 4/2023 Miyazaki .............. G02B 1/041 252/586

FOREIGN PATENT DOCUMENTS

CN 101633805 A 1/2010
JP H10-338869 A 12/1998
(Continued)

OTHER PUBLICATIONS

May 27, 2025 Office Action issued in Japanese Patent Application No. 2024-512817.

(Continued)

*Primary Examiner* — Bijan Ahvazi
(74) *Attorney, Agent, or Firm* — Oliff PLC

(57) ABSTRACT

A polymerizable composition for an optical article, including two or more (meth)acrylates and a photochromic compound. The two or more (meth)acrylates include at least a multifunctional (meth)acrylate containing a polyalkylene glycol moiety and having a molecular weight of 500 or more, and the (meth)acryloyl group content in the polymerizable composition for an optical article is 3.50 mmol/g or more.

15 Claims, 1 Drawing Sheet

(51) Int. Cl.

| | |
|---|---|
| ***C09D 4/06*** | (2006.01) |
| ***C09D 5/29*** | (2006.01) |
| ***C09D 135/02*** | (2006.01) |
| ***G02C 7/10*** | (2006.01) |

(52) U.S. Cl.

CPC ............. *C09D 5/29* (2013.01); *C09D 135/02* (2013.01); *G02C 7/102* (2013.01)

(56) References Cited

FOREIGN PATENT DOCUMENTS

| | | | | | |
|---|---|---|---|---|---|
| JP | 2019127450 A | * | 8/2019 | ................ | C08F 2/44 |
| JP | 2021-107513 A | | 7/2021 | | |
| WO | 03/011967 A1 | | 2/2003 | | |
| WO | 2021/132047 A1 | | 7/2021 | | |
| WO | 2021/172511 A1 | | 9/2021 | | |

OTHER PUBLICATIONS

Sep. 2, 2025 Office Action issued in Japanese Patent Application No. 2024-512817.

May 23, 2023 International Search Report issued in International Patent Application No. PCT/JP2023/013259.

Sep. 24, 2024 International Preliminary Report on Patentability issued in International Patent Application No. PCT/JP2023/013259.

Mar. 16, 2026 Office Action issued in Korean Patent Application No. 10-2024-7030833.

May 26, 2026 Extended European Search Report issued in European Patent Application No. 23780913.2.

* cited by examiner

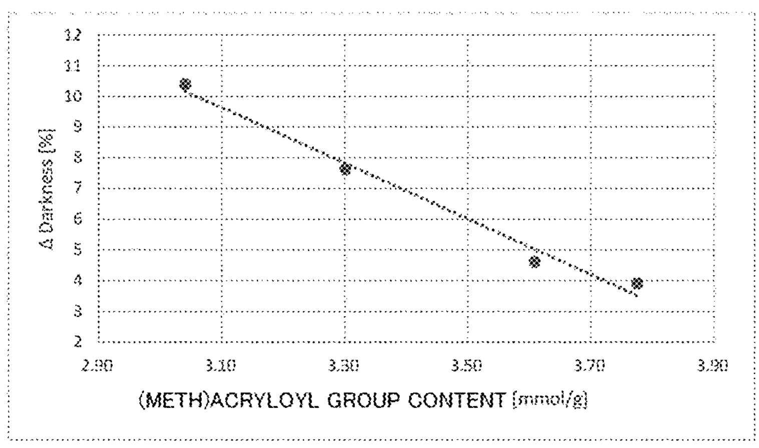
Δ Darkness [%]
12
11
10
9
8
7
6
5
4
3
2
2.90
3.10
3.30
3.50
3.70
3.90
(METH)ACRYLOYL GROUP CONTENT [mmol/g]

POLYMERIZABLE COMPOSITION FOR OPTICAL ARTICLE AND OPTICAL ARTICLE

TECHNICAL FIELD

The present invention relates to a polymerizable composition for an optical article and an optical article.

BACKGROUND ART

A photochromic compound is a compound having a property of developing a color under emission of light in a wavelength range having photoresponsivity and fading without light emission (photochromic properties). As a method of imparting photochromic properties to an optical article such as a spectacle lens, a method in which a coating containing a photochromic compound and a polymerizable compound is provided on a substrate, and the coating is cured to form a cured layer having photochromic properties (photochromic layer) may be exemplified (for example, refer to PTL 1).

CITATION LIST

Patent Literature

[PTL 1] WO 2003/011967

SUMMARY OF INVENTION

Technical Problem

It is desirable for the optical article having the above photochromic properties to exhibit a fast fading rate after color development upon exposure to light outdoors and the like. In addition, examples of properties required for the optical article include excellent weather resistance. However, according to the studies performed by the inventors, there is a trade-off relationship between a fading rate and weather resistance, and it is difficult to achieve both a fast fading rate and excellent weather resistance in the related art.

An object of one aspect of the present invention is to provide a polymerizable composition for an optical article that can form a photochromic layer having a fast fading rate and excellent weather resistance.

Solution to Problem

One aspect of the present invention relates to a polymerizable composition for an optical article (hereinafter simply referred to as a "composition") containing two or more (meth)acrylates and a photochromic compound. The two or more (meth)acrylates include at least a multifunctional (meth)acrylate containing a polyalkylene glycol moiety and having a molecular weight of 500 or more (hereinafter referred to as a "component A"). In addition, the (meth) acryloyl group content in the polymerizable composition for an optical article is 3.50 mmol/g or more.

As an example, a photochromic compound undergoes structural change through an excited state when it receives light such as sunlight. The structure after structural change due to light emission may be called a "colored component." On the other hand, the structure before light emission may be called a "colorless component." Here, regarding the colorless component, "colorless" is not limited to being completely colorless, and includes a case in which the color is lighter than that of the colored component. After the colored component undergoes structural change due to light emission and a color is developed, when the rate of structural change from the colored component to the colorless component is faster, the fading rate is faster. It is thought that, in the photochromic layer, when molecular motion of the photochromic compound is easier in the matrix formed by the polymerization reaction of the polymerizable compound, the rate of structural change is faster. In order to increase such a rate, a flexible matrix is considered desirable. In relation to the above point, the inventors speculate that the component A can contribute to making the matrix flexible. Specifically, it is thought that the reason why a flexible matrix can be formed by the component A is that the molecular weight of the component A is 500 or more and the component A has a polyalkylene glycol moiety.

In addition, the inventors speculate that the (meth)acryloyl group content of 3.50 mmol/g or more in the composition contributes to formation of a rigid polymer network between molecules in a matrix formed from such a composition. The inventors think that the reason why the composition can form a photochromic layer having excellent weather resistance is that diffusion of active species that can cause a decrease in weather resistance can be inhibited in a matrix having a rigid polymer network.

Thus, the inventors think that, using the composition, it is possible to form a photochromic layer having a fast fading rate and excellent weather resistance. However, the present invention is not limited to the speculations described in this specification.

Advantageous Effects of Invention

According to one aspect of the present invention, it is possible to provide a polymerizable composition for an optical article that can form a photochromic layer having a fast fading rate and excellent weather resistance after color development upon exposure to light. In addition, according to one aspect of the present invention, it is possible to provide an optical article having a photochromic layer having a fast fading rate and excellent weather resistance after color development upon exposure to light.

BRIEF DESCRIPTION OF DRAWINGS

FIG. 1 shows a graph in which the ΔDarkness values are plotted against the (meth)acryloyl group content in polymerizable compositions of examples and comparative examples.

DESCRIPTION OF EMBODIMENTS

[Polymerizable Composition for Optical Article]

Hereinafter, a polymerizable composition for an optical article according to one aspect of the present invention will be described in more detail.

In the present invention and this specification, the polymerizable composition is a composition containing a polymerizable compound. The polymerizable compound is a compound having a polymerizable group. The polymerizable composition for an optical article according to one aspect of the present invention is a polymerizable composition used for producing an optical article, and may be a coating composition for an optical article, and more specifically, a coating composition for forming a photochromic layer of an optical article. The coating composition for an optical article is a composition applied to a substrate for producing an optical article. Examples of optical articles include various lenses such as a spectacle lens and a goggles lens, a visor (cap) part of a sun visor, and a shield member of a helmet. For example, a spectacle lens produced by applying the composition to a lens substrate becomes a spectacle lens having a photochromic layer and can exhibit photochromic properties.

In the present invention and this specification, "(meth) acrylate" refers to both an acrylate and a methacrylate. An "acrylate" is a compound having one or more acryloyl groups in one molecule. A "methacrylate" is a compound having one or more methacryloyl groups in one molecule. The number of functional groups of the (meth)acrylate is the number of groups selected from the group consisting of acryloyl groups and methacryloyl groups contained in one molecule. In the present invention and this specification, a "methacrylate" contains only a methacryloyl group as a (meth)acryloyl group, and something that contains an acryloyl group and a methacryloyl group as (meth)acryloyl groups is an acrylate. The acryloyl group may be contained in the form of an acryloyloxy group, and the methacryloyl group may be contained in the form of a methacryloyloxy group. The "(meth)acryloyl group" described below refers to both an acryloyl group and a methacryloyl group, and "(meth)acryloyloxy group" refers to both an acryloyloxy group and a methacryloyloxy group. In addition, unless otherwise specified, the groups described may have substituents or may be unsubstituted. When a group has a substituent, examples of substituents include an alkyl group (for example, a linear alkyl group having 1 to 6 carbon atoms or a branched alkyl group having 1 to 6 carbon atoms), a hydroxyl group, an alkoxy group (for example, an alkoxy group having 1 to 6 carbon atoms), a halogen atom (for example, a fluorine atom, a chlorine atom, and a bromine atom), a cyano group, an amino group, a nitro group, an acyl group, a carboxy group, an aryl group, and a polyether group. In addition, for a group having a substituent, "the number of carbon atoms" is the number of carbon atoms of a part containing no substituents. In addition, in the present invention and this specification, "linear alkyl group or branched alkyl group" does not include a cycloalkyl group. The linear alkyl group or branched alkyl group may be unsubstituted or may have a substituent. It is allowable for the linear alkyl group or branched alkyl group to have a cycloalkyl group (for example, a cyclohexyl group) as a substituent. In one aspect, it is preferable that the linear alkyl group or branched alkyl group not include a cycloalkyl group as a substituent.

<(Meth)acryloyl Group Content>

In order to improve weather resistance, the (meth)acryloyl group content of the composition is 3.50 mmol/g or more, preferably 3.55 mmol/g or more, more preferably 3.60 mmol/g or more, still more preferably 3.65 mmol/g or more, yet more preferably 3.70 mmol/g or more, and yet more preferably 3.75 mmol/g or more. The (meth)acryloyl group content of the composition may be, for example, 5.00 mmol/g or less, 4.50 mmol/g or less or 4.00 mmol/g or less, or may exceed the values exemplified here.

The "(meth)acryloyl group content" of the polymerizable composition containing (meth)acrylates is calculated as follows.

Based on the mass, the content of each (meth)acrylate is calculated based on a total amount of "1" of (meth)acrylates contained in the polymerizable composition.

For each (meth)acrylate, "the (meth)acryloyl group content× the content" is calculated. The sum of the values calculated thus for all (meth)acrylates contained in the polymerizable composition is the (meth)acryloyl group content of the polymerizable composition.

<Polymerizable Compound>

The composition contains two or more (meth)acrylates as polymerizable compounds, and the two or more (meth) acrylates include at least a multifunctional (meth)acrylate containing a polyalkylene glycol moiety and having a molecular weight of 500 or more (component A).

Hereinafter, the component A will be described in more detail.

(Component A)

The component A is a multifunctional (meth)acrylate containing a polyalkylene glycol moiety and having a molecular weight of 500 or more. In the present invention and this specification, the "polyalkylene glycol moiety" refers to a substructure represented by the following Formula 2:

[C1]

(Formula 2)

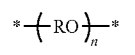

In Formula 2, R represents an alkylene group, n represents the number of repetitions of alkoxy groups represented by RO and is 2 or more. * indicates a bonding position at which the substructure represented by Formula 2 is bonded to an adjacent atom. The number of carbon atoms of the alkylene group represented by R may be 1 or more or 2 or more, and may be, for example, 5 or less or 4 or less. Specific examples of alkylene groups represented by R include an ethylene group, a propylene group, and a tetramethylene group. n is 2 or more, and may be, for example, 30 or less, 25 or less or 20 or less. In one aspect, the component A may have the above substructure in which R represents an ethylene group, that is, have a polyethylene glycol moiety. In addition, in one aspect, the component A may have the above substructure in which R represents a propylene group, that is, have a polypropylene glycol moiety.

The molecular weight of the component A is 500 or more. In the present invention and this specification, for the molecular weight of the polymer, a theoretical molecular weight calculated from the structural formula determined by structural analysis of the compound or the material preparation ratio during production is used. The molecular weight of the component A is 500 or more, preferably 510 or more, more preferably 520 or more, preferably 550 or more, more preferably 570 or more, still more preferably 600 or more, still more preferably 630 or more, and yet more preferably 650 or more. The molecular weight of the component A is preferably, for example, 2000 or less, 1500 or less, 1200 or less, 1000 or less, or 800 or less, in order to increase the hardness of the photochromic layer.

The component A is a multifunctional (meth)acrylate, and may be, for example, a difunctional, trifunctional, tetrafunctional or pentafunctional (meth)acrylate, and is preferably a bifunctional or trifunctional (meth)acrylate. The component A may contain, as a (meth)acryloyl group, only an acryloyl group, only a methacryloyl group, or an acryloyl group and a methacryloyl group. That is, the component A may be an acrylate or a methacrylate.

In one aspect, the component A may be an acyclic multifunctional (meth)acrylate. In the present invention and this specification, "acyclic" means that a component does not include a cyclic structure. On the other hand, "cyclic"

means that a component includes a cyclic structure. The acyclic multifunctional (meth)acrylate is a di- or higher functional (meth)acrylate including no cyclic structure. Specific examples of such components A include polyalkylene glycol di(meth)acrylate represented by the following Formula 3.

[C2]

(Formula 3)

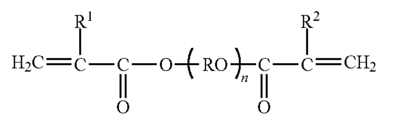

In Formula 3, $R^1$ and $R^2$ each independently represent a hydrogen atom or a methyl group, R represents an alkylene group, and n represents the number of repetitions of alkoxy groups represented by RO and is 2 or more. R and n are described above for the substructure represented by Formula 2. The polyalkylene glycol di(meth)acrylate represented by Formula 3 may contain, as a (meth)acryloyl group, only an acryloyl group, only a methacryloyl group, or an acryloyl group and a methacryloyl group. Specific examples of polyalkylene glycol di(meth)acrylates represented by Formula 3 include polyethylene glycol di(meth)acrylate, polypropylene glycol di(meth)acrylate, and polytetramethylene glycol di(meth)acrylate.

In addition, specific examples of components A include tri(meth)acrylate represented by the following Formula 4. The tri(meth)acrylate represented by Formula 4 may contain, as a (meth)acryloyl group, only an acryloyl group, only a methacryloyl group, or an acryloyl group and a methacryloyl group.

[C3]

(Formula 4)

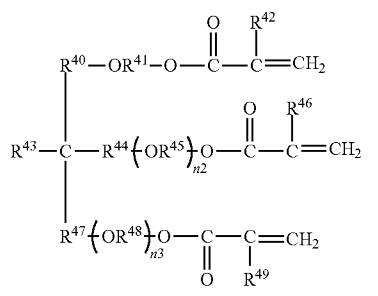

In Formula 4, $R^{40}$, $R^{41}$, $R^{44}$, $R^{45}$, $R^{47}$ and $R^{48}$ each independently represent an alkylene group, $R^{43}$ represents an alkyl group, $R^{42}$, $R^{46}$ and $R^{49}$ each independently represent a hydrogen atom or a methyl group. n1 represents the number of repetitions of alkoxy groups represented by $OR^{41}$ and is 2 or more. n2 represents the number of repetitions of alkoxy groups represented by $OR^{45}$, and is 2 or more. n3 represents the number of repetitions of alkoxy groups represented by $OR^{48}$ and is 2 or more.

Hereinafter, Formula 4 will be described in more detail.

$R^{41}$, $R^{45}$ and $R^{48}$ in Formula 4 are as described above for R in Formula 2. n1, n2 and n3 in Formula 4 are as described above for n in Formula 2. In Formula 4, $R^{41}$, $R^{45}$ and $R^{48}$ may be the same, or two or three thereof may be different from each other. The same applies to n1, n2 and n3.

$R^{42}$, $R^{46}$ and $R^{49}$ each independently represent a hydrogen atom or a methyl group. The tri(meth)acrylate represented by Formula 4 may contain, as a (meth)acryloyl group, only an acryloyl group, only a methacryloyl group, or an acryloyl group and a methacryloyl group.

The number of carbon atoms of the alkyl group represented by $R^{43}$ may be 1 or more or 2 or more, and may be, for example, 5 or less or 4 or less. The alkyl group represented by $R^{43}$ may be a linear alkyl group or a branched alkyl group. Specific examples of alkyl groups represented by $R^{43}$ include a methyl group and an ethyl group.

$R^{40}$, $R^{44}$ and $R^{47}$ each independently represent an alkylene group. The number of carbon atoms of such an alkylene group may be 1 or more or 2 or more, and may be, for example, 5 or less or 4 or less. Specific examples thereof include an ethylene group, a propylene group, and a tetramethylene group.

Specific examples of tri(meth)acrylates represented by Formula 4 include trimethylolpropane polyoxyethylene ether tri(meth)acrylate.

(Monofunctional (meth)acrylate)

In order to increase the (meth)acryloyl group content of the polymerizable composition containing (meth)acrylates, a (meth)acrylate having a high proportion of (meth)acryloyl groups in the molecule is preferable. In this regard, a monofunctional (meth)acrylate having a low molecular weight is preferable, and a monofunctional (meth)acrylate having a molecular weight of 150 or less is more preferable. The monofunctional (meth)acrylate having a molecular weight of 150 or less may be a cyclic monofunctional (meth)acrylate or an acyclic monofunctional (meth)acrylate. Specific examples of a cyclic monofunctional (meth)acrylate having a molecular weight of 150 or less include glycidyl(meth)acrylate. Specific examples of acyclic monofunctional (meth)acrylates having a molecular weight of 150 or less include n-butyl(meth)acrylate. The molecular weight of the monofunctional (meth)acrylate having a molecular weight of 150 or less may be, for example, 100 or more, but is not limited thereto.

(Multifunctional (meth)acrylate)

As described above, in order to increase the (meth) acryloyl group content of the polymerizable composition containing (meth)acrylates, a (meth)acrylate having a high proportion of (meth)acryloyl groups in the molecule is preferable. In this regard, a multifunctional (meth)acrylate having a smaller molecular weight than the component A is also preferable. As such a multifunctional (meth)acrylate, a multifunctional (meth)acrylate having more functional groups than the multifunctional (meth)acrylate used as the component A is also preferable. The molecular weight of such a multifunctional (meth)acrylate is preferably less than 500, 400 or less, 300 or less or 200 or less. The molecular weight may be, for example, 100 or more, but is not limited thereto. In addition, examples of such multifunctional (meth)acrylates include deca- or higher (for example, deca- or higher and pentadeca- or lower) multifunctional (meth) acrylates. Specific examples include poly[(3-methacryloyloxypropyl)silsesquioxane]derivatives described in the example section to be described below.

Examples of (meth)acrylates that can be contained in the composition include a monofunctional (meth)acrylate represented by the following Formula 1 (hereinafter referred to as a "component B") and a difunctional (meth)acrylate represented by the following Formula 5 (hereinafter referred to as a "component C"). In one aspect, the composition may be a polymerizable composition containing one or more (meth)acrylates selected from the group consisting of a monofunctional (meth)acrylate represented by the following Formula 1 and a difunctional (meth)acrylate represented by the following Formula 5. In other aspect, the composition may be a polymerizable composition that does not contain one or more (meth)acrylates selected from the group consisting of a monofunctional (meth)acrylate represented by the following Formula 1 and a difunctional (meth)acrylate represented by the following Formula 5. In one aspect, the composition may contain the component B as a monofunctional (meth)acrylate having a molecular weight of 150 or less.

(Component B)

The component B is a monofunctional (meth)acrylate represented by the following Formula 1.

[C4]

(Formula 1)

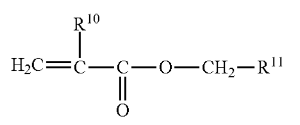

Hereinafter, Formula 1 will be described in more detail.

In Formula 1, $R^{10}$ represents a hydrogen atom or a methyl group. The monofunctional (meth)acrylate represented by Formula 1 may be an acrylate or a methacrylate.

$R^{11}$ represents a linear alkyl group having 3 or more carbon atoms or a branched alkyl group having 3 or more carbon atoms. These alkyl groups may be unsubstituted or may have a substituent. The substituent is not particularly limited, and for example, the various substituents described above may be exemplified. The number of carbon atoms of the linear or branched alkyl group represented by $R^{11}$ is 3 or more, preferably 4 or more, more preferably 5 or more, and still more preferably 6 or more, 7 or more, 8 or more, 9 or more, 10 or more, and 11 or more in that order. On the other hand, in consideration of the solubility of the photochromic compound in the composition, the number of carbon atoms is preferably 15 or less, more preferably 14 or less, and still more preferably 13 or less and 12 or less in that order.

The molecular weight of the monofunctional (meth)acrylate represented by Formula 1 may be, for example, 100 or more, or may be, for example, 300 or less. However, the molecular weight is not limited to the above range. As described above, in one aspect, the monofunctional (meth) acrylate represented by Formula 1 may be a monofunctional (meth)acrylate having a molecular weight of 150 or less. Specific examples of monofunctional (meth)acrylates represented by Formula 1 include n-butyl(meth)acrylate, 2-ethylhexyl(meth)acrylate, isodecyl(meth)acrylate, and n-lauryl (meth)acrylate.

(Component C)

The component C is a (meth)acrylate represented by the following Formula 5:

[C5]

(Formula 5)

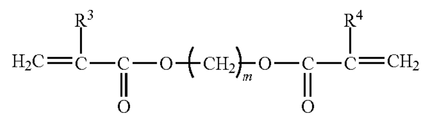

In Formula 5, $R^3$ and $R^4$ each independently represent a hydrogen atom or a methyl group, and m represents an integer of 1 or more. m may be 1 or more, and may be, for example, 10 or less, 9 or less, 8 or less, 7 or less or 6 or less.

The molecular weight of the component C may be, for example, 400 or less, and in order to further increase the coloring density of the photochromic layer, the molecular weight is preferably 350 or less, more preferably 300 or less, and still more preferably 250 or less. In addition, the molecular weight of the component C may be for example, 100 or more, 150 or more or 200 or more.

The component C may contain, as a (meth)acryloyl group, only an acryloyl group, only a methacryloyl group, or an acryloyl group and a methacryloyl group. Specific examples of components C include 1,9-nonanediol di(meth)acrylate, 1,6 -hexanediol di(meth)acrylate, and 1,10-decanediol di(meth)acrylate.

In the composition, the content of the component A is preferably 50 mass % or more, more preferably 55 mass % or more, and still more preferably 60 mass % or more based on a total amount of 100 mass % of the polymerizable compounds contained in the composition. In one aspect, the component A may be a component whose proportion is the largest among the plurality of polymerizable compounds contained in the composition. In addition, the content of the component A may be 90 mass % or less, 85 mass % or less or 80 mass % or less based on a total amount of 100 mass % of the polymerizable compounds contained in the composition. The composition may contain only one type of component A in one aspect, and may contain two or more types thereof in another aspect. When the composition contains two or more types of components A, the content of the component A is a total content of two or more types thereof. This similarly applies to the contents of other components.

The composition may contain the various (meth)acrylates described above in an amount such that the (meth)acryloyl group content of the composition is 3.50 mmol/g or more. For example, the composition contains preferably 5 mass % or more, more preferably 10 mass % or more, and still more preferably 15 mass % or more of the monofunctional (meth)acrylate having a molecular weight of 150 or less, based on a total amount of 100 mass % of the polymerizable compounds contained in the composition. In addition, the content of the monofunctional (meth)acrylate having a molecular weight of 150 or less is preferably 30 mass % or less and more preferably 25 mass % or less based on a total amount of 100 mass % of the polymerizable compounds contained in the composition.

The content of the polymerizable compound in the composition (that is, a total content of a plurality of polymerizable compounds) may be, for example, 80 mass % or more, 85 mass % or more or 90 mass % or more based on a total amount of 100 mass % of the composition. In addition, the content of the polymerizable compound in the composition may be, for example, 99 mass % or less, 95 mass % or less, 90 mass % or less or 85 mass % or less based on a total amount of 100 mass % of the composition. In the present invention and this specification, regarding the content, the "total amount of the composition" is a total amount of all components excluding a solvent in the composition containing the solvent. The composition may or may not contain a solvent. When the composition contains a solvent, any solvent in an arbitrary amount can be used as a usable solvent as long as it does not inhibit progress of the polymerization reaction of the polymerizable composition.

<Photochromic Compound>

The composition contains a photochromic compound together with the polymerizable compound. As the photochromic compound contained in the composition, known compounds exhibiting photochromic properties can be used. The photochromic compound can exhibit photochromic properties with respect to, for example, ultraviolet rays. Examples of photochromic compounds include compounds having a known framework that exhibits photochromic properties, such as azobenzenes, spiropyrans, spirooxazines, naphthopyrans, indenonaphthopyrans, phenanthropyrans, hexaallylbisimidazoles, donor-acceptor Stenhouse adducts (DASA), salicylidene anilines, dihydropyrenes, anthracene dimers, fulgides, diarylethenes, phenoxynaphthacenequinones, and stilbenes. Preferable examples of photochromic compounds include fulgimide compounds, spirooxazine compounds, chromene compounds, and indeno-fused naphthopyran compounds. In addition, examples of photochromic compounds include one or more selected from the group consisting of photochromic compounds represented by General Formula A, photochromic compounds represented by General Formula B and photochromic compounds represented by General Formula C described in WO 2022/138966. The photochromic compounds may be used alone or two or more thereof may be used in combination. The content of the photochromic compounds of the composition may be, for example, about 0.1 to 15 mass %, based on a total amount of 100 mass % of the composition, but the content is not limited to this range.

<Other Components>

The composition may contain one or more types of various additives that can be generally added to the polymerizable composition in an arbitrary content in addition to the polymerizable compound and the photochromic compound. Examples of additives that can be added to the composition may include a polymerization initiator that allows a polymerization reaction to progress.

For example, regarding the polymerization initiator, a known polymerization initiator can be used, and a radical polymerization initiator is preferable, and it is more preferable that only a radical polymerization initiator be contained as a polymerization initiator. In addition, regarding the polymerization initiator, a photopolymerization initiator or a thermal polymerization initiator can be used, and in order for a polymerization reaction to progress in a short time, a photopolymerization initiator is preferable. Examples of photoradical polymerization initiators include benzoin ketals such as 2,2-dimethoxy-1,2-diphenylethane-1-one; α-hydroxyketones such as 1-hydroxycyclohexylphenyl ketone, 2-hydroxy-2-methyl-1-phenylpropan-1-one, and 1-[4-(2-hydroxyethoxy)phenyl]-2-hydroxy-2-methyl-1-propane-1-one; α-aminoketones such as 2-benzyl-2-dimethylamino-1-(4-morpholinophenyl)-butane-1-one, and 1,2-methyl-1-[4-(methylthio)phenyl]-2-morpholinopropan-1-one; oxime esters such as 1-[(4-phenylthio)phenyl]-1,2-octadione-2-(benzoyl)oxime; phosphine oxides such as bis(2,4,6-trimethylbenzoyl)phenylphosphine oxide, bis(2,6-dimethoxybenzoyl)-2,4,4-trimethylpentyl phosphine oxide, and 2,4,6-trimethylbenzoyldiphenylphosphine oxide; 2,4,5-triarylimidazole dimers such as 2-(o-chlorophenyl)-4,5-diphenylimidazole dimer, 2-(o-chlorophenyl)-4,5-di(methoxyphenyl)imidazole dimer, 2-(o-fluorophenyl)-4,5-diphenylimidazole dimer, 2-(o-methoxyphenyl)-4,5-diphenylimidazole dimer, and 2-(p-methoxyphenyl)-4,5-diphenylimidazole dimer; benzophenone compounds such as benzophenone, N,N'-tetramethyl-4,4'-diaminobenzophenone, N,N'-tetraethyl-4,4'-diaminobenzophenone, and 4-methoxy-4'-dimethylaminobenzophenone; quinone compounds such as 2-ethylanthraquinone, phenanthrenequinone, 2-tert-butylanthraquinone, octamethylanthraquinone, 1,2-benzanthraquinone, 2,3-benzanthraquinone, 2-phenylanthraquinone, 2,3-diphenylanthraquinone, 1-chloroanthraquinone, 2-methylanthraquinone, 1,4-naphthoquinone, 9,10-phenanthraquinone, 2-methyl-1,4-naphthoquinone, and 2,3-dimethylanthraquinone; benzoin ethers such as benzoin methyl ether, benzoin ethyl ether, and benzoin phenyl ether; benzoin compounds such as benzoin, methyl benzoin, and ethyl benzoin; benzyl compounds such as benzyl dimethyl ketal; acridine compounds such as 9-phenylacridine, 1,7-bis(9,9'-acridinyl heptane); and N-phenylglycine, and coumarin. In addition, in the 2,4,5-triarylimidazole dimer, substituents on the aryl groups of two triarylimidazole moieties may provide the same symmetric compound, or may provide different asymmetric compounds. In addition, a thioxanthone compound and a tertiary amine may be combined such as a combination of diethylthioxanthone and dimethylaminobenzoic acid. Among these, in consideration of curability, transparency and heat resistance, α-hydroxyketone and phosphine oxide are preferable. The content of the polymerization initiator may be, for example, in a range of 0.1 to 5 mass % based on a total amount of 100 mass % of the composition.

Known additives that can be generally added to the composition containing a photochromic compound, for example, additives such as a surfactant, an antioxidant, a radical scavenger, a light stabilizer, a UV absorbing agent, an anti-coloring agent, an antistatic agent, a fluorescent dye, a dye, a pigment, a fragrance, a plasticizer, and a silane coupling agent in an arbitrary amount can be additionally added to the composition. Known compounds can be used as these additives.

The composition can be prepared by simultaneously or sequentially mixing the various components described above in any order.

[Optical Article]

One aspect of the present invention relates to an optical article including a substrate and a photochromic layer obtained by curing the composition.

Hereinafter, the optical article will be described in more detail.

<Substrate>

The optical article can have a photochromic layer on a substrate selected according to the type of the optical article. As an example of the substrate, a spectacle lens substrate may be a plastic lens substrate or a glass lens substrate. The glass lens substrate may be, for example, a lens substrate made of inorganic glass. The lens substrate is preferably a plastic lens substrate because it is light-weight, hard to break, and easy to handle. Examples of plastic lens substrates include (meth)acrylic resins, styrene resins, polycarbonate resins, allyl resins, allyl carbonate resins such as diethylene glycol bis(allyl carbonate) resins (CR-39), vinyl resins, polyester resins, polyether resins, urethane resins obtained by reacting an isocyanate compound with a hydroxy compound such as diethylene glycol, thiourethane resins obtained by reacting an isocyanate compound with a polythiol compound, and a cured product (generally referred to as a transparent resin) obtained by curing a curable composition containing a (thio)epoxy compound having one or more disulfide bonds in the molecule. As the lens substrate, an undyed substrate (colorless lens) may be used or a dyed substrate (dyed lens) may be used. The refractive index of the lens substrate may be, for example, about 1.50 to 1.75. However, the refractive index of the lens substrate is not limited to the above range, and may be within the above range, or may be above or below outside the above range. In the present invention and this specification, the refractive index is a refractive index for light having a wavelength of 500 nm. In addition, the lens substrate may be a lens having refractive power (so-called prescription lens) or a lens having no refractive power (so-called no-prescription lens).

The spectacle lens may include various lenses such as a single focus lens, a multifocal lens, and a progressive power lens. The type of the lens is determined by the surface shape of both sides of the lens substrate. In addition, the surface of the lens substrate may be a convex surface, a concave surface, or a flat surface. In a general lens substrate and spectacle lens, the object-side surface is a convex surface and the eyeball-side surface is a concave surface. However, the present invention is not limited thereto. The photochromic layer may be generally provided on the object-side surface of the lens substrate, or may be provided on the eyeball-side surface.

<Photochromic Layer>

The photochromic layer of the optical article can be formed by directly applying the composition onto the surface of the substrate or indirectly applying the composition onto the surface of the substrate with one or more other layers, and performing a curing treatment on the applied composition. Examples of other layers include a primer layer for improving the adhesion between the photochromic layer and the substrate. Such a primer layer is known. As the coating method, known coating methods such as a spin coating method and a dip coating method can be used, and a spin coating method is preferable in consideration of coating uniformity. The curing treatment may be light emission and/or heat treatment, and light emission is preferable in order for the curing reaction to progress in a short time. Curing treatment conditions may be determined according to the types of various components (polymerizable compounds, polymerization initiators and the like described above) contained in the composition, and the formulation of the composition. The thickness of the photochromic layer formed in this manner is, for example, preferably in a range of 5 to 80 μm, and in order to exhibit better photochromic properties, the thickness is more preferably in a range of 20 to 60 μm, still more preferably in a range of 20 to 50 μm, and yet more preferably in a range of 25 to 45 μm. Regarding the viscosity of the composition, in order to form a photochromic layer having a thickness in a preferable range and excellent uniformity in thickness, the viscosity at a temperature of 25° C. is preferably 20 mPa·s or more. The viscosity at a temperature of 25° C. may be, for example, 50 mPa·s or less or 40 mPa·s or less. However, in order to improve uniformity of the thickness of the photochromic layer, the viscosity of the composition may be a viscosity exceeding the values exemplified here.

The optical article having the photochromic layer may or may not have one or more functional layers in addition to the photochromic layer. Examples of functional layers include layers known as functional layers of the optical article such as a protective layer, an antireflection layer, a water-repellent or hydrophilic anti-fouling layer, and an anti-fogging layer for improving the durability of the optical article.

One aspect of the optical article is a spectacle lens. In addition, as one aspect of the optical article, a goggles lens, a visor (cap) part of a sun visor, a shield member of a helmet, and the like may be exemplified. When the composition is applied to such a substrate for an optical article and a curing treatment is performed on the applied composition to form a photochromic layer, it is possible to obtain an optical article having an anti-glare function.

[Eyeglasses]

One aspect of the present invention relates to eyeglasses including a spectacle lens, which is one aspect of the optical article. The details of the spectacle lens included in the eyeglasses are described above. When the eyeglasses include such a spectacle lens, for example, the photochromic compound contained in the photochromic layer develops a color when hit with sunlight outdoors and an anti-glare effect can be exhibited like sunglasses, and when returned to indoors, the photochromic compound can fade to restore transmission. Known techniques can be applied to the configuration of the frame and the like for the eyeglasses.

EXAMPLES

Hereinafter, the present invention will be described in more detail with reference to examples. However, the present invention is not limited to embodiments shown in examples.

Examples 1 and 2 and Comparative Examples 1 and 2

<Preparation of Polymerizable Composition for Optical Article (Coating Composition for Forming Photochromic Layer)>

In a plastic container, components shown in Table 1 were mixed in the amounts shown in Table 1.

In the mixture of the polymerizable compound obtained in this manner, the following photochromic compound (indeno-fused naphthopyran compound represented by the structural formula described in U.S. Pat. No. 6,296,785), a photoradical polymerization initiator (bis(2,4,6-trimethylbenzoyl)phenylphosphine oxide (Omnirad 819, commercially available from IGM Resin B. V.)), an antioxidant (bis[3-(3-tert-butyl-4-hydroxy-5-methylphenyl)propionic acid][ethylenebis(oxyethylene)]), and a light stabilizer (bis(1,2,2,6,6-pentamethyl-4-piperidyl) sebacate) were mixed and sufficiently stirred. Then, defoaming was performed with a rotation/revolution type stirring defoaming device. Accordingly, a polymerizable composition for an optical article (coating composition for forming a photochromic layer) was prepared. The content of the component based on a total amount of 100 mass % of the composition was 94.9 mass % for the mixture of the polymerizable compounds, 3 mass % for the photochromic compound, 0.3 mass % for the photoradical polymerization initiator, 0.9 mass % for the antioxidant, and 0.9 mass % for the light stabilizer.

[C6]

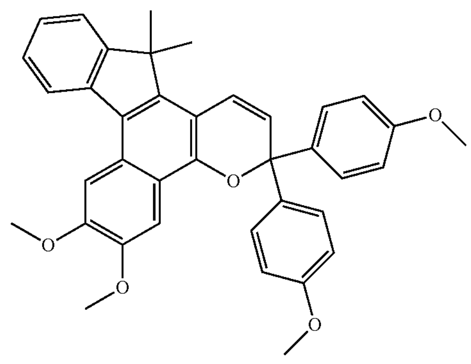

TABLE 1

| | Molecular weight | (Meth)acryloyl group content [mmol/g] | Comparative Example 1 | Comparative Example 2 | Example 1 | Example 2 |
|---|---|---|---|---|---|---|
| Trimethylolpropane polyoxyethylene ether trimethacrylate | 1264 | 2.4 | 65 | 65 | 56 | 65 |
| n-Laurylmethacrylate | 254 | 3.9 | 20 | 20 | | 5 |
| 1,9-Nonanediol dimethacrylate | 296 | 6.8 | | 10 | | 5 |
| n-Butyl methacrylate | 142 | 7.0 | | | 20 | 20 |
| Poly[(3-methacryloyloxypropyl)silsesquioxane] derivatives | 179 | 5.6 | 5 | 5 | | 5 |
| 1,2,2,6,6-Pentamethyl-4-piperidyl methacrylate | 239 | 4.2 | 10 | | | |
| Polypropylene dimethacrylate | 561 | 3.6 | | | 24 | |

(unit: parts by mass)

[C7]

Trimethylolpropane Polyoxyethylene Ether Trimethacrylate

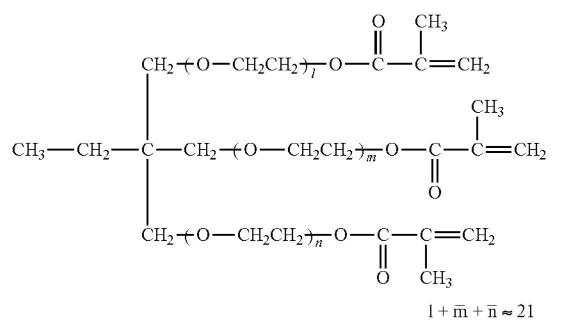

[C8]

n-Lauryl Methacrylate

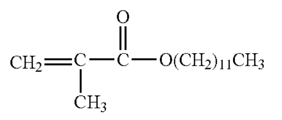

[C9]

1,9-Nonanediol Dimethacrylate

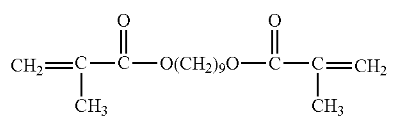

[C10]

n-Butyl Methacrylate

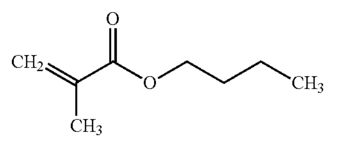

[C11]

Poly[(3-methacryloyloxypropyl)silsesquioxane] Derivatives

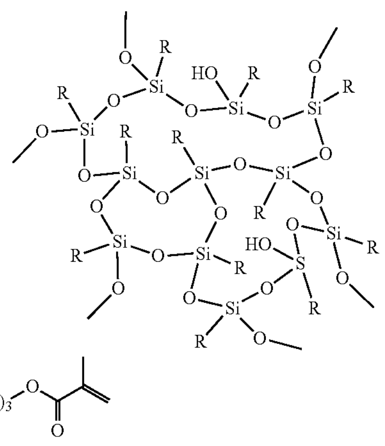

[C12]

Polypropylene Glycol Dimethacrylate

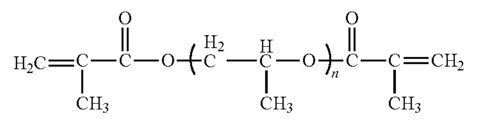

The viscosity of the compositions for forming a photochromic layer of Examples 1 and 2 and Comparative Examples 1 and 2 was measured by the following method.

Using a viscometer (VM-100A, commercially available from Sekonic Corporation), the liquid level of the sample was adjusted and fixed so that it was about 2 to 3 mm from the end of the detection terminal, and the viscosity at a liquid temperature of 25° C. was measured. The measured viscosity was Example 1: 34 mPa·s, Example 2: 30 mPa s, Comparative Example 1: 25 mPa·s, and Comparative Example 2: 23 mPa·s.

<Production of Spectacle Lens>

A plastic lens substrate (product name HI-LUX; center thickness 2.2 mm, radius 70 mm, S0.00, commercially available from Hoya Corporation) was washed with pure water and dried. Then, the coating composition for forming a photochromic layer prepared above is applied to the convex surface (object-side surface) of the plastic lens substrate by a spin coating method. Spin coating was performed by the method described in Japanese Patent Application Publication No. 2005-218994. Then, the composition applied onto the plastic lens substrate was irradiated with ultraviolet rays (a wavelength of 405 nm) in a nitrogen atmosphere (an oxygen concentration of 500 ppm or less), and the composition was cured to form a photochromic layer. The thickness of the formed photochromic layer was 40 μm. A photochromic layer having excellent uniformity in thickness could be formed using each composition for forming a photochromic layer having the above viscosity.

In this manner, a spectacle lens having a photochromic layer was produced.

Evaluation Method (1) Evaluation of Fading Rate

For each spectacle lens photochromic layer (a cured layer obtained by curing the polymerizable composition) of the examples and comparative examples, light was emitted to the surface of the photochromic layer through an aeromass filter using a xenon lamp for 15 minutes (900 seconds), and the photochromic compound in the photochromic layer was caused to develop a color. The transmittance (measurement wavelength: 550 nm) during color development was measured with a spectrophotometer (commercially available from Otsuka Electronics Co., Ltd.). The light emission was performed so that irradiances and tolerances of irradiances specified in JIS T7333: 2005 were values shown in the following Table 2. The transmittance measured in this manner is called a "transmittance during color development."

TABLE 2

| Wavelength range(nm) | Irradiance ($W/m^2$) | Tolerance of irradiance ($W/m^2$) |
|---|---|---|
| 300~340 | <2.5 | — |
| 340~380 | 5.6 | ±1.5 |
| 380~420 | 12 | ±3.0 |
| 420~460 | 12 | ±3.0 |
| 460~500 | 26 | ±2.6 |

After measuring the transmittance during color development, the transmittance was measured 60 seconds after light emission was stopped (hereinafter referred to as "transmittance after 60 s of fading"). The fading rate (unit: %/sec) was calculated by the calculation formula: fading rate=[(transmittance after 60 s of fading-transmittance during color development)/60]. It can be said that the higher the value of the fading rate obtained in this manner, the faster the fading rate.

(2) Evaluation of Weather Resistance

The weather resistance of the spectacle lenses of the examples and comparative examples was evaluated by the weather resistance test method described in ISO 8980-3: 2013. In the weather resistance evaluation result, the amount of change in transmittance during color development (hereinafter referred to as ΔDarkness) was obtained, and when the ΔDarkness value is 6.0% or less, it can be said that the weather resistance is excellent.

The above results are shown in Table 3. In addition, FIG. 1 shows a graph in which the ΔDarkness values are plotted against the (meth)acryloyl group content in the polymerizable compositions of the examples and comparative examples. FIG. 1 also shows an approximation line obtained by the least squares method.

TABLE 3

| | (Meth)acryloyl group content [mmol/g] | Fading rate [%/s] | Weather resistance Δ Darkness [%] |
|---|---|---|---|
| Comparative Example 1 | 3.04 | 0.43 | 10.4 |
| Comparative Example 2 | 3.30 | 0.43 | 7.6 |
| Example 1 | 3.61 | 0.40 | 4.6 |
| Example 2 | 3.78 | 0.43 | 3.9 |

Based on the results shown in Table 3, it was confirmed that the spectacle lenses of Examples 1 and 2 exhibited a fading rate equivalent to that of the spectacle lenses of Comparative Examples 1 and 2 and had excellent weather resistance. That is, it was confirmed that the spectacle lenses of Examples 1 and 2 could achieve both a fast fading rate and excellent weather resistance.

The inventors thought that the multifunctional (meth) acrylate (trimethylolpropane polyoxyethylene ether trimethacrylate, polypropylene glycol dimethacrylate) corresponding to the component A contributes to making the spectacle lenses of Examples 1 and 2 exhibit a fast fading rate. Regarding the weather resistance, it was confirmed from the graph shown in FIG. 1 that there was a correlation between the (meth)acryloyl group content of the composition and ΔDarkness, and when the (meth)acryloyl group content of the composition was set to 3.50 mmol/g or more, ΔDarkness could be 6.0% or less.

Finally, the above aspects will be summarized.

[1]A polymerizable composition for an optical article, including two or more (meth)acrylates and a photochromic compound, wherein the two or more (meth) acrylates include at least a multifunctional (meth)acrylate containing a polyalkylene glycol moiety and having a molecular weight of 500 or more, and the (meth)acryloyl group content in the polymerizable composition for an optical article is 3.50 mmol/g or more.

[2] The polymerizable composition for an optical article according to [1], wherein the two or more (meth)acrylates include a monofunctional (meth)acrylate having a molecular weight of 150 or less.

[3] The polymerizable composition for an optical article according to [1] or [2], wherein the polyalkylene glycol moiety of the component A is selected from the group consisting of a polyethylene glycol moiety and a polypropylene glycol moiety.

[4] The polymerizable composition for an optical article according to any one of [1] to [3],
wherein the component A is a bifunctional or trifunctional (meth)acrylate.

[5] The polymerizable composition for an optical article according to any one of [1] to [4],
wherein the viscosity at a temperature of 25° C. is 20 mPa·s or more.

[6] An optical article including a substrate and a photochromic layer obtained by curing the polymerizable composition for an optical article according to any one of [1] to [5].

[7] The optical article according to [6], which is a spectacle lens.

[8] The optical article according to [6], which is a goggle lens.

[9] The optical article according to [6], which is a visor part of a sun visor.

[10] The optical article according to [6], which is a shield member of a helmet.

[11] Eyeglasses including the spectacle lens according to [7].

Two or more of the various aspects and various forms described in this specification may be combined in arbitrary combinations.

The embodiments disclosed herein are only examples in all respects and should not be considered as restrictive. The scope of the present invention is not limited to the above description, but is defined by the scope of claims, and is intended to encompass equivalents to the scope of claims and all modifications within the scope of the claims.

INDUSTRIAL APPLICABILITY

The present invention is beneficial in the technical fields of eyeglasses, goggles, sun visors, helmets and the like.

The invention claimed is:

1. A polymerizable composition for an optical article, comprising:
two or more (meth)acrylates; and
a photochromic compound,
wherein the two or more (meth)acrylates include at least component A,
wherein the component A is a tri(meth)acrylate represented by the following Formula 4 with a molecular weight of 500 or more, Formula 4

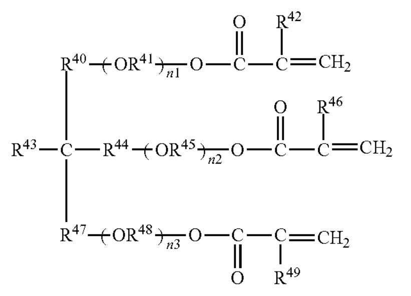

where:
$R^{40}$, $R^{41}$, $R^{44}$, $R^{45}$, $R^{47}$ and $R^{48}$ each independently represent an alkylene group,
$R^{43}$ represents an alkyl group,
$R^{42}$, $R^{46}$ and $R^{49}$ each independently represent a hydrogen atom or a methyl group,
n1 represents a number of repetitions of groups represented by $OR^{41}$ and is 2 or more,
n2 represents a number of repetitions of groups represented by $OR^{45}$, and is 2 or more,
n3 represents a number of repetitions of groups represented by $OR^{48}$ and is 2 or more, and
wherein the (meth)acryloyl group content in the polymerizable composition for an optical article is 3.50 mmol/g or more and 4.00 mmol/g or less.

2. The polymerizable composition for an optical article according to claim 1,
wherein the two or more (meth)acrylates include a monofunctional (meth)acrylate having a molecular weight of 150 or less.

3. The polymerizable composition for an optical article according to claim 2,
wherein the polyalkylene glycol moiety of the component A is selected from the group consisting of a polyethylene glycol moiety and a polypropylene glycol moiety.

4. The polymerizable composition for an optical article according to claim 3, further comprising a multifunctional (meth)acrylate containing a polyalkylene glycol moiety and having a molecular weight of 500 or more, in addition to the component A.

5. The polymerizable composition for an optical article according to claim 2, further comprising a multifunctional (meth)acrylate containing a polyalkylene glycol moiety and having a molecular weight of 500 or more, in addition to the component A.

6. The polymerizable composition for an optical article according to claim 1,
wherein the polyalkylene glycol moiety of the component A is selected from the group consisting of a polyethylene glycol moiety and a polypropylene glycol moiety.

7. The polymerizable composition for an optical article according to claim 6, further comprising a multifunctional (meth)acrylate containing a polyalkylene glycol moiety and having a molecular weight of 500 or more, in addition to the component A.

8. The polymerizable composition for an optical article according to claim 1, further comprising a multifunctional (meth)acrylate containing a polyalkylene glycol moiety and having a molecular weight of 500 or more, in addition to the component A.

9. The polymerizable composition for an optical article according to claim 1,
wherein the viscosity at a temperature of 25° C. is 20 mPa·s or more.

10. An optical article comprising:
a substrate; and
a photochromic layer obtained by curing the polymerizable composition for an optical article according to claim 1.

11. The optical article according to claim 10,
wherein the viscosity of the polymerizable composition for an optical article at a temperature of 25° C. is 20 mPa·s or more.

12. The optical article according to claim 10, which is a spectacle lens.

13. The optical article according to claim 10, which is a goggle lens, a visor part of a sun visor or a shield member of a helmet.

14. Eyeglasses comprising the spectacle lens according to claim 12.

15. The polymerizable composition for an optical article according to claim 1, wherein a content of the component A in the polymerizable composition is 50 mass % or more and 80 mass % or less based on a total amount of 100 mass % of polymerizable compounds contained in the polymerizable composition.

* * * * *